United States Patent
Mazzetto et al.

(10) Patent No.: US 6,216,420 B1
(45) Date of Patent: *Apr. 17, 2001

(54) DEVICE FOR HEAT SEALING A TUBE OF PACKAGING SHEET MATERIAL FILLED WITH A POURABLE FOOD PRODUCT

(75) Inventors: Maurizio Mazzetto, Modena (IT); Robert Karlsson, Hong Kong (HK); Roland Palmqvist, Akarp (SE)

(73) Assignee: Tetra Laval Holdings & Finance S.A., Pully (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,051

(22) Filed: Mar. 19, 1999

(30) Foreign Application Priority Data

Mar. 24, 1998 (IT) .............................. TO98U0054
Jan. 12, 1999 (IT) .............................. TO99A0010

(51) Int. Cl.⁷ .................................. B65B 51/10
(52) U.S. Cl. .................. 53/373.7; 53/374.2; 53/375.9
(58) Field of Search .................. 53/374.2, 373.7, 53/375.9, 373.8, 376.2, 550, 551

(56) References Cited

U.S. PATENT DOCUMENTS

| | | |
|---|---|---|
| 3,738,080 | 6/1973 | Reil . |
| 4,027,455 | 6/1977 | Rausing et al. . |
| 4,387,547 | 6/1983 | Reil . |
| 4,484,977 | 11/1984 | Andersson . |
| 4,512,138 * | 4/1985 | Greenawalt .................. 53/374.2 |
| 4,546,592 | 10/1985 | Reil . |
| 4,606,174 | 8/1986 | Berg . |
| 4,608,810 | 9/1986 | Bordini . |
| 4,617,779 | 10/1986 | Nygren et al. . |
| 4,641,486 | 2/1987 | Zannoni . |
| 4,747,253 | 5/1988 | Schulte . |
| 5,067,311 | 11/1991 | Andersson . |
| 5,155,980 | 10/1992 | Mansson et al. . |
| 5,564,255 | 10/1996 | Giacomelli . |
| 5,571,370 * | 11/1996 | Selberg et al. .................. 53/374.2 |
| 5,678,392 * | 10/1997 | Konno .................. 53/374.2 |
| 5,714,033 * | 2/1998 | Hayashi et al. .................. 53/374.2 |
| 5,787,690 * | 8/1998 | Konno .................. 53/374.2 |

* cited by examiner

Primary Examiner—Eugene Kim
(74) Attorney, Agent, or Firm—Burns, Doane, Swecker & Mathis. L.L.P.

(57) ABSTRACT

The device (1) for heat sealing a tube (3) of packaging sheet material filled with a pourable food product, has first and second jaws (8, 9) movable towards each other to grip the tube (3) under pressure and heat seal the tube. The first jaw (8) has a heating element (14) having a pair of substantially straight active surfaces (17), which extend on opposite sides of and parallel to an intermediate plane (π). The second jaw (9) has a pair of pressure pads (22), which are housed in respective seats (23) and cooperate with the active surfaces (17) of the heating element (14). Each of the pads has a first longitudinal portion (24) supported rigidly in a seat (23), and a second longitudinal portion (25) supported pliably in the seat (23) and located adjacent to and on the opposite side of the first longitudinal portion (24) with respect to the intermediate plane (π).

13 Claims, 3 Drawing Sheets

DEVICE FOR HEAT SEALING A TUBE OF PACKAGING SHEET MATERIAL FILLED WITH A POURABLE FOOD PRODUCT

The present invention relates to a device for heat sealing a tube of packaging sheet material filled with a pourable food product.

In particular, the present invention relates to a heat seal device which may suitably form part of packaging machines for continuously forming, from said tube of packaging material, aseptic sealed packages containing pourable food products.

Many pourable food products, such as fruit juice, pasteurized or UHT (ultra-high-temperature-processed) milk, wine, tomato sauce, etc., are sold in packages made of sterilized packaging material.

A typical example of such a package is the parallelepiped package for liquid or pourable food products known as Tetra Brik Aseptic (registered trademark), which is formed by folding and sealing a strip-rolled packaging material. The rolled packaging material comprises layers of fibrous material, e.g. paper, covered on both sides with a thermoplastic material, e.g. polyethylene; and the side of the packaging material eventually contacting the food product in the package also has a layer of barrier material, e.g. an aluminium sheet, which in turn is covered with a layer of thermoplastic material.

As is known, such packages are produced on fully automatic packaging machines, on which a continuous tube is formed from the strip-fed packaging material; the strip of packaging material is sterilized on the packaging machine, e.g. by applying a chemical sterilizing agent, such as a hydrogen peroxide solution; following sterilization, the sterilizing agent is removed, e.g. vaporized by heating, from the surfaces of the packaging material; and the strip of packaging material so sterilized is kept in a closed sterile environment, and is folded and sealed longitudinally to form a tube.

The tube is then filled with the sterilized or sterile-processed food product, and is sealed and cut at equally spaced cross sections into pillow packs, which are subsequently folded mechanically to form finished, e.g. substantially parallelepiped, packages.

Packaging machines of the above type are known in which the cross sections of the tube are sealed using heat seal devices substantially comprising a first and a second jaw movable towards each other in a direction crosswise to the tube axis. The jaws grip the tube under pressure at each cross section and heat seal the tube along two respective transverse sealing lines, between which the tube is subsequently cut to form the pillow packs and then the parallelepiped packages.

The first jaw comprises, at the front, an induction heating element defining two elongated straight active surfaces, which interact with and heat the tube material to the sealing temperature, and extend on opposite sides of and parallel to an intermediate plane perpendicular to the tube axis.

The second jaw comprises two supporting elements, which extend symmetrically on opposite sides of and parallel to the intermediate plane, face respective active surfaces of the first jaw, and in turn comprise, at the front, respective pressure pads made of plastic material. The pressure pads have respective flat front contact surfaces, which cooperate with respective active surfaces of the first jaw to heat seal the tube along respective sealing lines. More specifically, each front contact surface of the first jaw comprises a first flat longitudinal portion parallel to and facing a first longitudinal end portion of the front surface of the respective pressure pad; a second flat longitudinal portion facing an intermediate longitudinal portion of the front surface of the pressure pad and inclined with respect to the first portion so as to extend away from the pressure pad; and a third flat longitudinal portion facing a second longitudinal end portion of the front surface of the respective pressure pad, and which may either be parallel to the first portion or extend along a projection of the second portion.

Though widely used, known devices of the above type all suffer from one major drawback:poor efficiency. This is due to the front contact surfaces of the first jaw comprising an inclined portion, which, though necessary to ensure a local reduction in pressure on the tube and so expel the food product in the tube from the heat seal region, results in dispersion of the heat produced by the heating element, and therefore in reduced overall efficiency of the heat seal operation.

Another drawback of known devices of the above type lies in the pressure pads—which normally have a cross section substantially in the form of a rectangular trapezium—being housed inside respective U-shaped seats on the second jaw. Which seats, being defined by substantially straight lateral surfaces, fail to ensure adequate retention of the pads, particularly in the event of impact or external stress.

Moreover, when the jaws are gripped together, the pressure pads are compressed in a direction perpendicular to the supply path of the tube, and therefore deform elastically in a direction parallel to the supply path and project laterally with respect to the respective supporting elements of the second jaw, both towards the intermediate plane and, in the opposite direction, beyond the respective lateral end edges of the second jaw, along which the pressure pads are susceptible to cutting or damage serious enough to impair the efficiency and working life of the pads.

To eliminate the above drawback, it has been necessary to modify the standard structure of the second jaw by providing, along the lateral end edges of the second jaw, in an intermediate position and at the longitudinal seal of the tube, respective projections defining a support for the lateral portions of the pressure pads subject to in-service deformation. It is an object of the present invention to provide a device for heat sealing a tube of packaging sheet material filled with a pourable food product, designed to eliminate the aforementioned drawbacks in a straightforward, low-cost manner, and which, in particular, provides for a high degree of sealing efficiency.

The present invention also provides a device for heat sealing a tube of packaging sheet material filled with a pourable food product, which does not compulsorily require any structural alterations to the second jaw of the device. According to the present invention, there is provided a device for heat sealing a tube of packaging sheet material filled with a pourable food product and fed along a vertical supply path; said device comprising a first and a second jaw movable towards each other in a direction crosswise to said supply path to grip said tube under pressure at a respective cross section and to heat seal the tube along two respective transverse sealing lines; said first jaw comprising heating means having a pair of substantially straight active surfaces, which cooperate with said tube and extend on opposite sides of and parallel to an intermediate plane perpendicular to said supply path; said second jaw comprising a pair of pressure pads, which are housed in respective seats on the second jaw, extend on opposite sides of and parallel to said intermediate plane, and cooperate with respective said active surfaces of said heating means to heat seal said tube along respective said sealing lines;

characterized in that said active surfaces of said heating means have respective longitudinal projections; and in that each said pressure pad comprises a first longitudinal portion supported substantially rigidly in the respective said seat and facing a corresponding said projection; and a second longitudinal portion supported pliably in said seat and located adjacent to and on the opposite side of said first longitudinal portion to said intermediate plane.

According to another aspect of the invention, there is provided a device for heat-sealing a tube of packaging sheet material filled with pourable food product, wherein said second jaw comprises pressure means having at least one contact surface which cooperates with said heating means to heat seal said tube along said sealing section;

characterized in that said contact surface comprises a main contact portion; and at least one shaped portion receding with respect to said main portion towards said second jaw.

A preferred non-limiting embodiment of the present invention will be described by way of example with reference to the accompanying drawings, in which.

Figure 1:
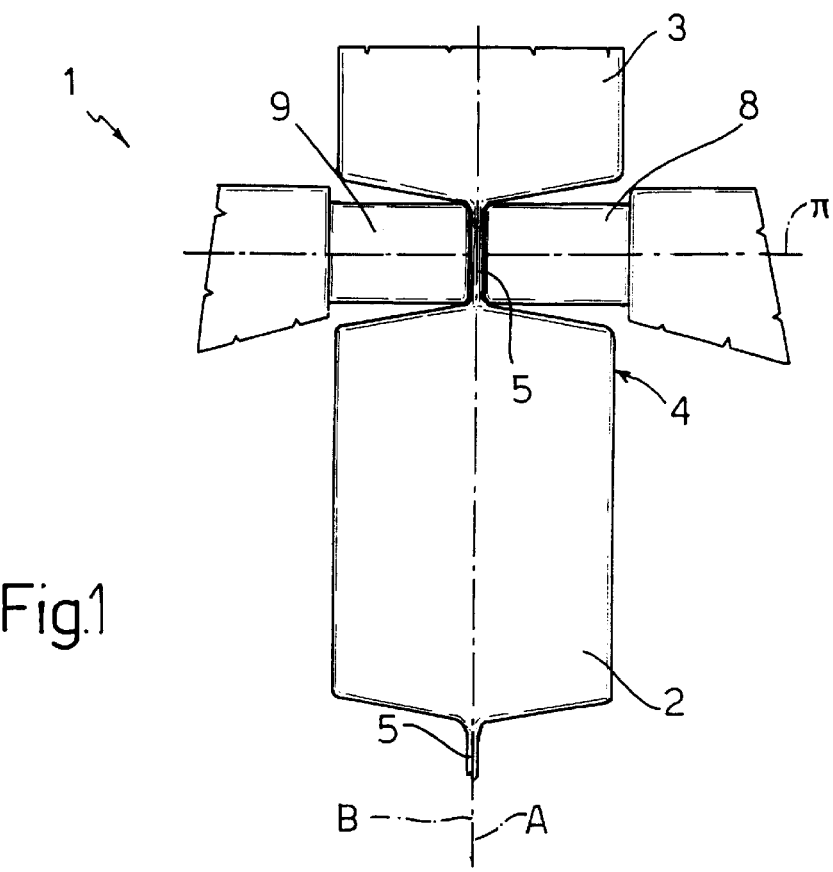
FIG. 1 shows a schematic side view of a heat seal device in accordance with the present invention.
Figure 2:
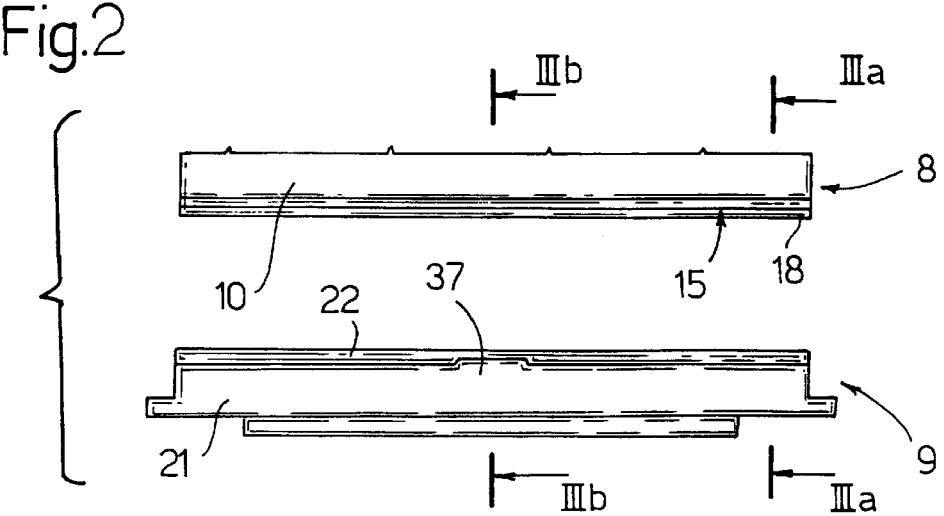
FIG. 2 shows a larger-scale side view of a detail of the FIG. 1 device.

The reference numeral in FIG. 1 indicates as a whole a heat seal device in accordance with the present invention.

Device 1 may suitably form part of a packaging machine (not shown) for continuously forming, from a tube 3 of packaging material, aseptic sealed packages 2 containing a pourable food product such as pasteurized or UHT milk, fruit juice, wine, etc.

Tube 3 is formed in known manner upstream from device 1 by longitudinally folding and sealing a strip of heat-seal sheet material; is filled with the sterilized or sterile-processed food product; and is fed by known devices (not shown) along a vertical path A coincident with its own longitudinal axis B.

Device 1 interacts with tube 3 to heat seal the tube at equally spaced cross sections and so form a vertical strip 4 of packages 2 connected to one another by respective transverse sealing bands 5. More specifically, device 1 heat seals each sealing band 5 along two spaced sealing lines (not shown) adjacent to the respective packages 2 connected by band 5; and, at a cutting station. (not shown) downstream from device 1, strip 4 is cut along each sealing band 5—more specifically, between the respective sealing lines—to separate packages 2.

Device 1 comprises two jaws—shown only partly and indicated 8 and 9 in the accompanying drawings—which are located diametrically opposite each other with respect to axis B, and are movable towards each other in a direction perpendicular to supply path A, and therefore to axis B, to grip under pressure and heat seal a respective cross section of tube 3 to define a respective sealing band 5 of strip 4 of packages 2.

Figure 3:
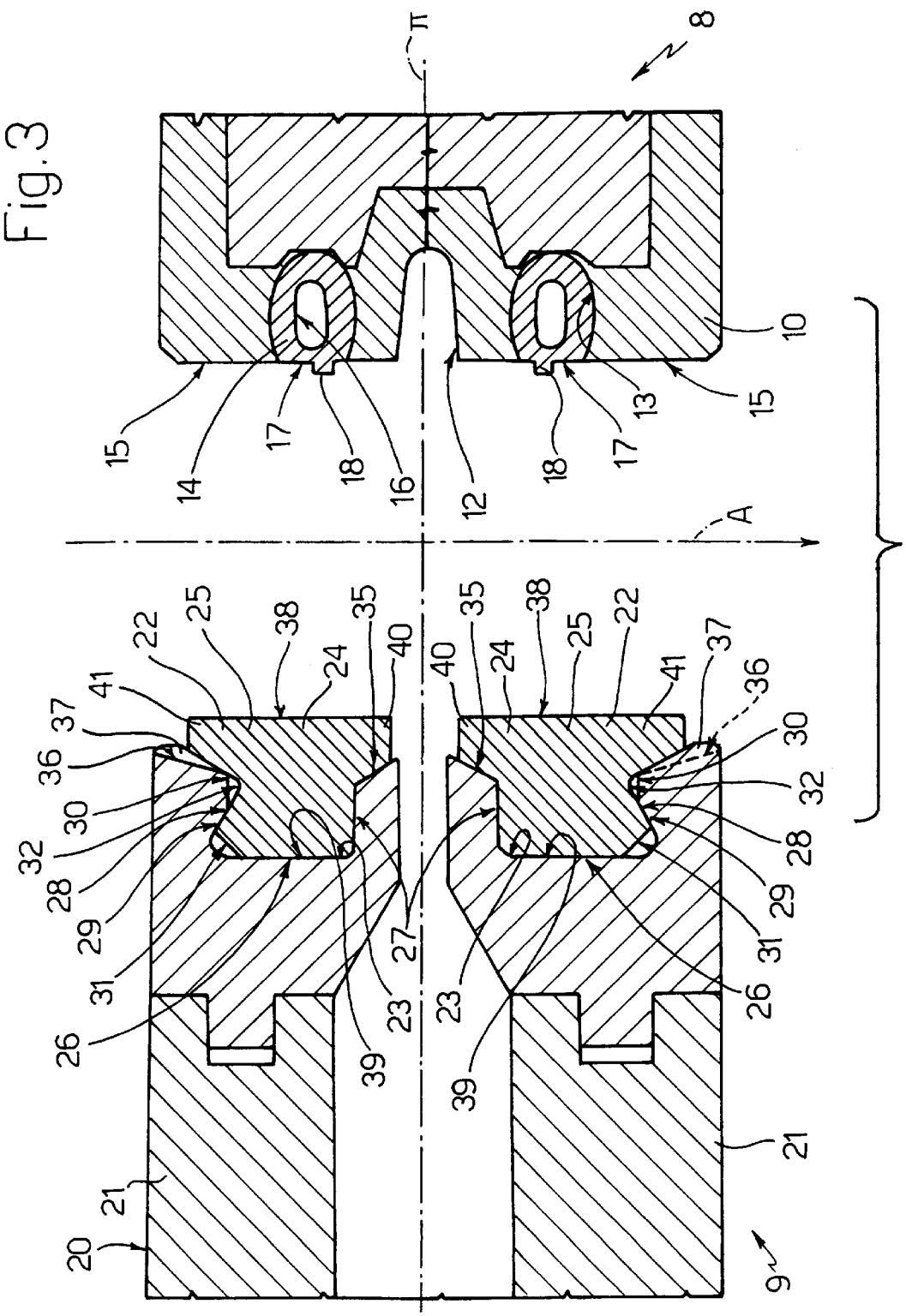
FIG. 3 shows a larger-scale section of the FIG. 2 detail, partly along plane IIIa—IIIa and partly along plane IIIb—IIIb.

With reference to FIG. 3, jaw 8 comprises a front portion 10 extending crosswise to supply path A and having a central recess 12, and a substantially U-shaped front groove 13 engaged by a correspondingly shaped induction heating element 14. More specifically, front portion 10 is defined, towards jaw 9, by two flat longitudinal contact surfaces 15 separated by recess 12 and which cooperate with tube 3.

Heating element 14 has a substantially annular cross section; an inner cavity 16 for the passage of cooling fluid; and a pair of elongated straight active surfaces 17, which interact with tube 3, extend on opposite sides of and parallel to an intermediate plane $\pi$ perpendicular to supply path A, and define respective intermediate longitudinal portions of surfaces 15.

Heating element 14 also comprises a pair of straight longitudinal projections 18 projecting from respective active surfaces 17 towards jaw 9, extending substantially the whole length of active surfaces 17, and which provide for increasing the grip pressure on tube 3 during heat sealing.

Jaw 9 comprises a supporting body 20 terminating towards jaw 8 with two transverse elements 21, which extend symmetrically on opposite sides of and parallel to intermediate plane $\pi$, and face respective contact surfaces 15 of jaw 8.

Transverse elements 21 are fitted at the front, towards jaw 8, with respective pressure pads 22 generally made of plastic material and which cooperate with respective active surfaces 17 of heating element 14 to grip and heat seal tube 3. More specifically, each pressure pad 22 is housed in a laterally substantially U-shaped front retaining seat 23 of respective transverse element 21.

According to the present invention, each pressure pad 22 comprises a first longitudinal portion 24 supported substantially rigidly in respective seat 23 and facing a respective projection 18 of heating element 14; and a second longitudinal portion 25 supported pliably inside seat 23 and located adjacent to and on the opposite side of longitudinal portion 24 to intermediate plane $\pi$.

Each seat 23 comprises a longitudinal end surface 26; a first flat longitudinal lateral surface 27; and a second longitudinal lateral surface 28 facing lateral surface 27 and defining an undercut with end surface 26.

More specifically, lateral surface 28 of each seat 23 comprises an oblique first portion 29 forming said undercut with end surface 26; and a straight second portion 30 extending, parallel to lateral surface 27, from portion 29 towards jaw 8.

Whereas longitudinal portion 24 of each pressure pad 22 is so shaped as to mate perfectly with the respective seat, longitudinal portion 25 forms with seat 23 two longitudinal, substantially triangular-section cavities 31, 32, one (31) of which extends between longitudinal portion 25, portion 29 of lateral surface 28, and end surface 26, and the other (32) between longitudinal portion 25 and portion 30 of lateral surface 28.

For each seat 23, jaw 9 also comprises two longitudinal front supporting surfaces 35, 36, which face jaw 8, are located on opposite sides of seat 23 with reference to supply path A, and slope with respect to intermediate plane $\pi$ so as to converge inwards of respective pressure pad 22.

Surfaces 35 are located adjacent to each other on opposite sides of intermediate plane $\pi$; and, at respective intermediate transverse portions, surfaces 36 define respective recesses, grooves or projections 37 which interact with the longitudinal seal of tube 3 of packaging material, at the intermediate portion where the longitudinal edges of tube 3 overlap.

Each pressure pad 22 is defined by a flat front surface 38 facing and parallel to respective contact surface 15 of jaw 8; and by a rear surface 39 parallel to front surface 38 and contacting end surface 26 of respective seat 23.

Each pressure pad 22 also comprises a pair of lateral lips 40, 41 contacting respective supporting surfaces 35, 36.

In actual use, when the respective cross section of tube 3 is gripped by jaws 8, 9, heating element 14 is supplied to heat seal the packaging material of band 5 along two sealing lines. Expulsion of the pourable food product inside tube 3 at the heat seal region is ensured by the reduction in the gripping pressure of tube 3 between longitudinal portion 24 and longitudinal portion 25 of each pressure pad 22. That is, by virtue of longitudinal portions 24 of pressure pads 22 being supported substantially rigidly inside respective seats 23 and interacting with projections 18, the corresponding gripping pressure on tube 3 is considerably greater than at longitudinal portions 25 of pads 22, which are supported pliably inside respective seats 23 by virtue of longitudinal cavities 31, 32.

Heat seal device 1 as described therefore provides for obtaining good-quality seals combined with a high degree of efficiency of the heat seal operation.

That is, pliable support of portions 25 of pressure pads 22 enables jaw 8 to be provided with perfectly flat front contact surfaces 15 facing pads 22, thus ensuring maximum use of the heat generated by heating element 14, and a high degree of efficiency of the heat seal operation.

Providing each seat 23 with a lateral surface 28 forming an undercut with respective end surface 26 also provides for improving retention of pressure pad 22 inside seat 23.

Finally, tests have shown that applying pressure gradually to tube 3—by each pressure pad 22 being supported partly rigidly and partly pliably—enables the same pressure pad to be used for heat sealing tubes of packaging material of different sizes, i.e. unlike known solutions, eliminates continual replacement of the pads according to the type of tube to be heat sealed. This characteristic, in addition to greatly reducing downtime to refit the machines, pad storage requirements and associated costs, also safeguards against the machine being fitted with the wrong pads for the type of package being produced.

Figure 4:
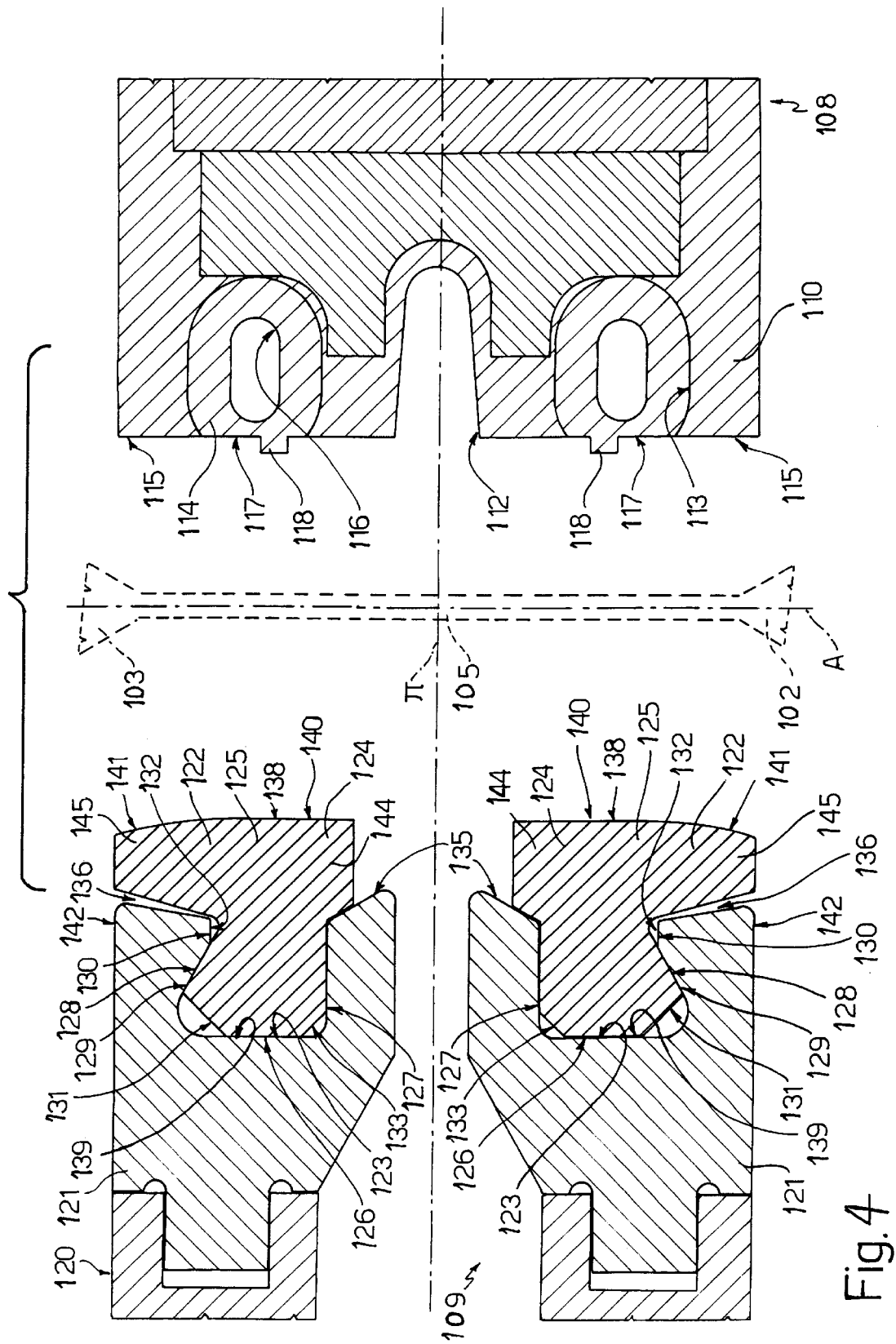
FIG. 4 shows a larger-scale cross section of a detail of the device of FIG. 2 and 3, according to another aspect of the invention.

Another embodiment of the heat-sealing device according to the invention is shown in FIG. 4.

Also in this embodiment, the device 1 comprises two jaws—shown only partly and indicated 108 and 109 in FIG. 4—which are located diametrically opposite each other with respect to supply path A, and are movable towards each other in a direction perpendicular to supply path A to grip under pressure and heat seal a respective cross section of tube 103 to define a respective sealing band 105 of strip of packages 102.

The jaw 108 comprises a front portion 110 extending crosswise to supply path A and having a central recess 112, and a substantially U-shaped front groove 113 engaged by a correspondingly shaped induction heating element 114. More specifically, front portion 110 is defined, towards jaw 109, by two flat longitudinal surfaces 115 separated by recess 112 and which interact with tube 103.

Heating element 114 has a substantially annular cross section; an inner cavity 116 for the passage of cooling fluid; and a pair of elongated straight active surfaces 117, which interact with tube 103, extend on opposite sides of and parallel to an intermediate plane π perpendicular to supply path A, and define respective intermediate longitudinal portions of surfaces 115.

Heating element 114 also comprises a pair of straight longitudinal projections 118 projecting from respective active surfaces 117 towards jaw 109, extending substantially the whole length of active surfaces 117, and which provide for increasing the grip pressure on tube 103 during heat sealing.

Jaw 109 comprises a supporting body 120 terminating towards jaw 108 with two transverse elements 121, which extend symmetrically on opposite sides of and parallel to intermediate plane π, and face respective surfaces 115 of jaw 108.

Transverse elements 121 are fitted at the front, towards jaw 108, with respective pressure pads 122 generally made of plastic material and which cooperate with respective active surfaces 117 of heating element 114 to grip and heat seal tube 103. More specifically, each pressure pad 122 is housed in a laterally substantially U-shaped front retaining seat 123 of respective transverse element 121.

Each pressure pad 122 comprises a first longitudinal portion 124 supported substantially rigidly in respective seat 123 and facing a respective projection 118 of heating element 114; and a second longitudinal portion 125 supported pliably inside seat 123 and located adjacent to and on the opposite side of longitudinal portion 124 to intermediate plane π.

Each seat 123 comprises a longitudinal end surface 126; a first flat longitudinal lateral surface 127; and a second longitudinal lateral surface 128 facing lateral surface 127 and defining an undercut with end surface 126.

More specifically, lateral surface 128 of each seat 123 comprises an oblique first portion 129 forming said undercut with end surface 126; and a straight second portion 130 extending, parallel to lateral surface 127, from portion 129 towards jaw 108.

Longitudinal portion 124 of each pressure pad 122 is shaped to mate with respective seat 123, and defines, with end surface 126 and with lateral surface 127, a longitudinal, substantially triangular-section cavity 133; and longitudinal portion 125 forms with seat 123 two longitudinal, substantially triangular-section cavities 131, 132, one (131) of which extends between longitudinal portion 125, portion 129 of lateral surface 128, and end surface 126, and the other (132) between longitudinal portion 125 and portion 130 of lateral surface 128.

For each seat 123, jaw 109 also comprises two longitudinal front supporting surfaces 135, 136, which face jaw 108, are located on opposite sides of seat 123 with reference to supply path A, and slope with respect to intermediate plane π so as to converge inwards of respective pressure pad 122. More specifically, surfaces 135 are located adjacent to each other on opposite sides of intermediate plane π.

Each pressure pad 122 is defined by a front contact surface 138 facing respective surface 115 of jaw 108 and which cooperates with respective active surface 117 of heating element 114; and by a flat rear surface 139 parallel to supply path A and contacting end surface 126 of respective seat 123.

Each contact surface 138 comprises a flat main portion 140 parallel to rear surface 139 and adjacent to intermediate plane π; and a shaped end portion 141 extending from main portion 140, in the opposite direction to intermediate plane π, and adjacent to a respective lateral end edge 142 of jaw 109.

According to an important aspect of the present invention, shaped portion 141 of each contact surface 138 recedes towards jaw 109 with respect to main portion 140, and diverges from supply path A towards respective lateral end edge 142 of jaw 109, so as to define, when tube 103 is contacted and respective pressure pad 122 is in the undeformed condition, a gap which is filled by the parts of pad 122 deformed elastically when jaws 108 and 109 are gripped.

More specifically, main portion 140 of each contact surface 138 faces and cooperates with projection 118 of respective active surface 117, whereas shaped portion 141 faces and cooperates with an end portion of respective surface 115 located on the opposite side of projection 118 to recess 112.

Shaped portion 141 of each contact surface 138 is preferably curved and convex towards jaw 108.

Each pressure pad 122 also comprises a pair of lateral lips 144, 145 which contact respective supporting surfaces 135, 136. More specifically, in the undeformed configuration of pressure pads 122, lip 144 contacts supporting surface 135, whereas lip 145 is detached from supporting surface 136.

In actual use, when the respective cross section of tube 103 is gripped by jaws 108, 109, heating element 114 is supplied to heat seal the packaging material of band 105 along two sealing lines.

At the initial gripping stage of tube 103 by jaws 108 and 109, the intermediate portions of pressure pads 122 cooperating with projections 118 of active surfaces 117 are compressed immediately, while the adjacent portions are relatively unstressed and so allow the food product to be expelled from sealing band 105. At this stage, expulsion of the pourable food product inside tube 103 at the heat seal region is also ensured by the reduction in the gripping pressure of tube 103 between longitudinal portion 124 and longitudinal portion 125 of each pressure pad 122. That is, by virtue of longitudinal portions 124 of pressure pads 122 being supported substantially rigidly inside respective seats 123 and interacting with projections 118, the corresponding gripping pressure on tube 103 is considerably greater than at longitudinal portions 125 of pads 122, which are supported pliably inside respective seats 123 by virtue of longitudinal cavities 131, 132.

Subsequently, when the gripping pressure between jaws 108 and 109 reaches maximum, each lip 145 comes into contact with respective surface 136, and each compressed pressure pad 122 deforms elastically in a direction parallel to path A, both towards intermediate plane $\pi$ and towards lateral end edge 142 of jaw 109, and occupies the gap between tube 103 and shaped portion 141 of contact surface 138, without projecting beyond lateral edge 142.

Pressure pads 122 are thus prevented from being damaged or cut close to lateral edges 142 of jaw 109, and the average working life of pads 122 is considerably increased. This is achieved without altering the structure of jaw 109, and in particular without providing the jaw with lateral projections for supporting pressure pads 122. Finally, as stated, shaped portions 141 define respective pressure release portions for releasing the pressure on contact surfaces 138 at the initial gripping stage of jaws 108 and 109, and, together with the difference in the support of portions 124 and 125 of pads 122 inside respective seats 123, provide for effectively squeezing the food product out of sealing band 105.

Clearly, changes may be made to device 1 as described herein without, however, departing from the scope of the accompanying Claims.

What is claimed is:

1. A device for heat-sealing a tube of packaging sheet material filled with a pourable food product and fed along a vertical supply path, comprising:

a first jaw comprising heating means, said heating means having a pair of substantially straight active surfaces, said active surfaces having longitudinal projections and extending on opposite sides of and parallel to an intermediate plane, said intermediate plane extending parallel to said supply path;

a second jaw comprising a pair of seats, a pair of pressure pads housed in said seats, said seats extending on opposite sides of and parallel to said intermediate plane;

said first jaw and said second jaw being movable towards each other in a direction crosswise to said supply path, said pressure pads of said second jaw co-operating with said heating means of said first jaw to grip said tube under pressure and to heat seal said tube along two respective transverse sealing lines;

wherein said second jaw comprises two longitudinal supporting surfaces located on opposite sides of each of said seats and facing said first jaw; and wherein each said pressure pad has a pair of lateral lips adjacent to said two longitudinal supporting surfaces at said opposite sides of each of said seats.

2. The device of claim 1, wherein said two longitudinal supporting surfaces slope with respect to said intermediate plane.

3. The device of claim 1, wherein said pressure pads each comprise:

first longitudinal portions located close to said intermediate plane and supported rigidly in said seats and facing said longitudinal projections, and longitudinal cavities defined between said second jaw and said pressure pads and being located further from said intermediate plane than said first longitudinal portion.

4. The device of claim 1, wherein said pressure pads have a shaped portion, said shaped portion being curved.

5. The device of claim 4, wherein said shaped portion is convex.

6. A device for heat-sealing a tube of packaging sheet material filled with a pourable food product and fed along a vertical supply path, comprising:

a first jaw comprising heating means, said heating means having a pair of substantially straight active surfaces, said active surfaces having longitudinal projections and extending on opposite sides of and parallel to an intermediate plane, said intermediate plane extending parallel to said supply path;

a second jaw comprising a pair of seats, a pair of pressure pads housed in said seats, said seats extending on opposite sides of and parallel to said intermediate plane;

said first jaw and said second jaw being movable towards each other in a direction crosswise to said supply path, said pressure pads of said second jaw co-operating with said heating means of said first jaw to grip said tube under pressure and to heat seal said tube along two respective transverse sealing lines;

wherein said second jaw comprises two longitudinal supporting surfaces located on opposite sides of each of said seats and facing said first jaw; and wherein each said pressure pad has a pair of lateral lips adjacent to said two longitudinal supporting surfaces at said opposite sides of each of said seats, wherein said two longitudinal supporting surfaces slope with respect to said intermediate plane, and;

wherein one of the lateral lips contacts a respective one of said supporting surfaces, and the other one said lateral lips is detached from the other one of said supporting surfaces when said pressure pad is in a non-deformed state.

7. A device for heat-sealing a tube of packaging sheet material filled with a pourable food product and fed along a vertical supply path, comprising:

a first jaw comprising heating means, said heating means having a pair of substantially straight active surfaces, said active surfaces having longitudinal projections and extending on opposite sides of and parallel to an intermediate plane, said intermediate plane extending parallel to said supply path;

a second jaw comprising a pair of seats, a pair of pressure pads housed in said seats said seats extending on opposite sides of and parallel to said intermediate plane;

said first jaw and said second jaw being movable towards each other in a direction crosswise to said supply path, said pressure pads of said second jaw co-operating with said heating means of said first jaw to grip said tube under pressure and to heat seal said tube along two respective transverse sealing lines;

wherein said second jaw comprises two longitudinal supporting surfaces located on opposite sides of each of said seats and facing said first jaw;

wherein each said pressure pad has a pair of lateral lips adjacent to said two longitudinal supporting surfaces at said opposite sides of each of said seats;

wherein said two longitudinal supporting surfaces slope with respect to said intermediate plane; and wherein one of said lateral lips contacts a respective one of said supporting surfaces, and the other one of said lateral lips is detached from the other one of said supporting surfaces when said pressure pad is in a non-deformed state.

8. The device of claim 7, wherein said pressure pads each comprise;

first longitudinal portions located close to said intermediate plane and supported substantially rigidly in said seats and facing said longitudinal projections; and longitudinal cavities defined between said second jaw and said pressure pads and being located further from said intermediate plane than said first longitudinal portion.

9. The device of claim 7, wherein said pressure pads have a shaped portion, said shaped portion being curved.

10. The device of claim 9, wherein said shaped portion is convex.

11. A device for heat-sealing a tube of packaging sheet material filled with a pourable food product and fed along a vertical supply path, comprising:

a first jaw comprising heating means, said heating means having a pair of substantially straight active surfaces, said active surfaces having longitudinal projections and extending on opposite sides of and parallel to an intermediate plane, said intermediate plane extending parallel to said supply path;

a second jaw comprising a pair of seats, a pair of pressure pads housed in said seats, said seats extending on opposite sides of and parallel to said intermediate plane;

said first jaw and said second jaw being movable towards each other in a direction crosswise to said supply path, said pressure pads of said second jaw co-operating with said heating means of said first jaw to grip said tube under pressure and to heat seal said tube along two respective transverse sealing lines;

wherein said second jaw comprises two longitudinal supporting surfaces located on opposite sides of each of said seats and facing said first jaw;

wherein each said pressure pad has a pair of lateral lips adjacent to said two longitudinal supporting surfaces at said opposite sides of each of said seats;

wherein said two longitudinal supporting surfaces are sloping with respect to said intermediate plane;

wherein one of said lateral lips contacts a respective one of said supporting surfaces, and the other one of said lateral lips is detached from the other one of said supporting surfaces when said pressure pad is in a non-deformed state; and wherein said pressure pads are curved.

12. The device of claim 11, wherein said pressure pads each comprise:

first longitudinal portions located close to said intermediate plane and supported substantially rigidly in said seats and facing said longitudinal projections; and longitudinal cavities defined between said second jaw and said pressure pads and being located further from said intermediate plane than said first longitudinal portion.

13. The device of claim 11, wherein said shaped portion is convex.

* * * * *